US006289153B1

United States Patent
Bergmann

(10) Patent No.: US 6,289,153 B1
(45) Date of Patent: Sep. 11, 2001

(54) LASER AIDED TILT ADJUSTMENT OF AN OPTICAL LENS

(75) Inventor: Ernest E. Bergmann, Fountain Hill, PA (US)

(73) Assignee: Agere Systems Optoelectronics Guardian Corp., Orlando, FL (US)

( * ) Notice: Subject to any disclaimer, the term of this patent is extended or adjusted under 35 U.S.C. 154(b) by 0 days.

(21) Appl. No.: 09/409,135

(22) Filed: Sep. 30, 1999

(51) Int. Cl.[7] .................................................. G02B 6/32
(52) U.S. Cl. .............................. 385/33; 385/31; 385/47; 385/52; 219/121.65; 219/121.66; 219/121.79; 219/121.82
(58) Field of Search .................................. 385/33, 52, 47, 385/31; 359/881, 224; 219/121.65, 121.66, 121.79, 121.82

(56) References Cited

U.S. PATENT DOCUMENTS

| 4,208,094 | * | 6/1980 | Tomlinson, III | 385/33 |
| 4,569,569 | * | 2/1986 | Stewart | 385/52 |
| 5,381,494 | * | 1/1995 | O'Donnell | 385/49 |
| 5,729,377 | | 3/1998 | Bergmann | 359/249 |
| 6,122,420 | * | 9/2000 | Satoh | 385/33 |

* cited by examiner

Primary Examiner—Audrey Chang
Assistant Examiner—Leo Boutsikaris
(74) Attorney, Agent, or Firm—Duane, Morris & Heckscher LLP

(57) ABSTRACT

A fiber optic apparatus and a method for altering the orientation of a mirror of the fiber optic apparatus using a laser. The fiber optic apparatus comprises an optical wave guide with at least one optical fiber, a retaining structure, and a mirror. The retaining structure includes at least one lens disposed therein. The optical wave guide is coupled to a first end of the retaining structure and the mirror is coupled to a second end of the retaining structure so that the lens is disposed between the wave guide and the mirror. When the apparatus is being assembled, a portion of the retaining structure is illuminated with a laser to correct misalignments of the components of the apparatus.

18 Claims, 5 Drawing Sheets

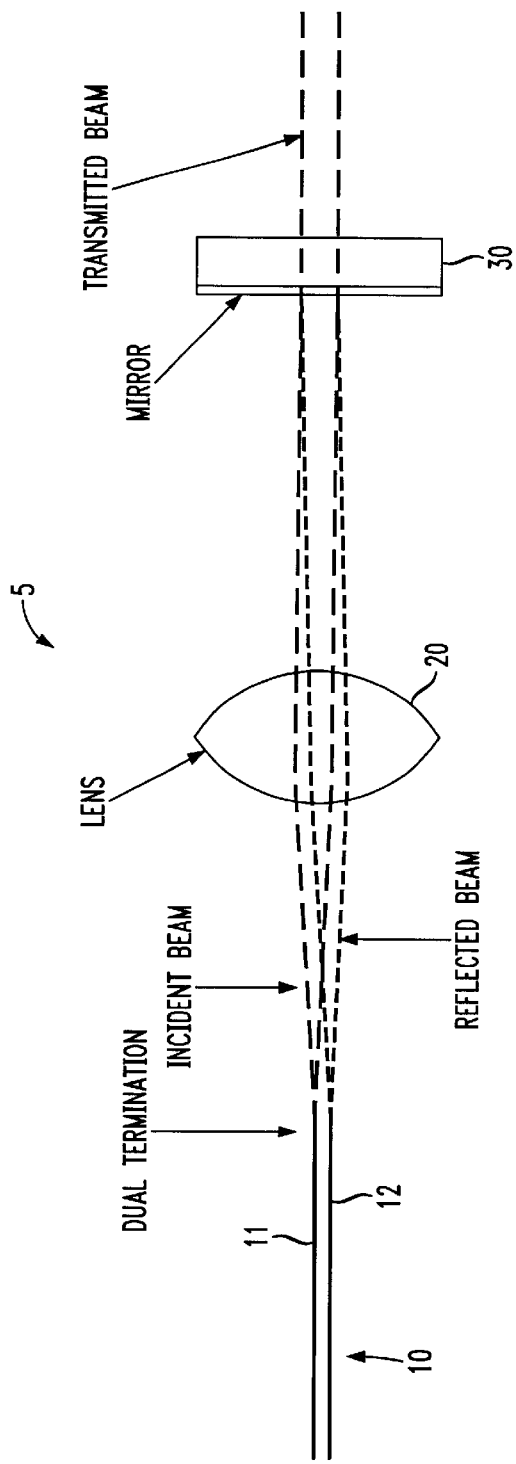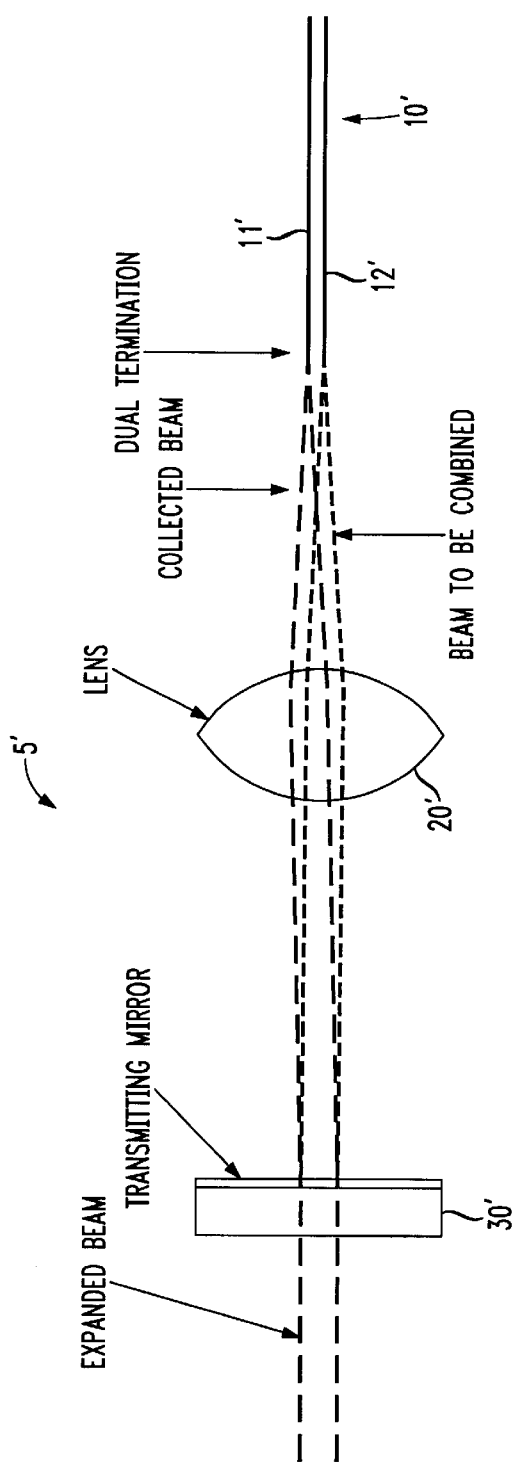
FIG. 1
PRIOR ART
FIG. 2
PRIOR ART

LASER AIDED TILT ADJUSTMENT OF AN OPTICAL LENS

FIELD OF THE INVENTION

The present invention relates to the field of fiber optics, and in particular, to a method and apparatus for altering a mirror orientation in a fiber optic device.

DESCRIPTION OF THE RELATED ART

Fiber optics have become increasingly popular in the field of telecommunications in recent years. This is in part because significantly more information can be transmitted using fiber optic lines than traditional telecommunications lines.

In the field of fiber optics there is often a need to have a reflective path that couples light from an input wave guide to an output wave guide. In most cases, the input and output wave guides are optical fibers. In such a case, the input fiber and output fiber are typically coupled together so that they are substantially parallel to one another. This is known in the art as a "dual termination" fiber optic wave guide.

An exemplary optical apparatus 5 and dual termination fiber optic wave guide 10 are shown in FIG. 1. The dual termination wave guide 10 includes a pair of fibers 11, 12 that are placed in a common ferrule (not shown) so that their center-to-center spacing is fixed. If, in construction, the ferrule is moved to align the fibers 11, 12, both fibers are moved as a unit. Alternatively, the dual termination wave guide 10 may simply be the end of a PLC (Planar Light guide Circuit) where two lithographically defined optical wave guides terminate; again alignment steps can only move both wave guides en masse.

In FIG. 1 the wave guide 10 supplies light that diverges from the end of the fiber 11 of the guide as it approaches a lens 20; this diverging beam is labeled "incident beam". With proper spacing of the lens 20 from the dual termination wave guide 10, the incident beam is collimated into a beam that has a constant cross-section along it length (ignoring diffraction effects). This collimated beam impinges upon a mirror 30 disposed on an opposite side of the lens 20. The mirror 30 reflects the collimated beam back towards the lens 20; this beam is labeled "reflected beam". It should be noted that a portion of the collimated beam which impinges upon the mirror 30 may not be reflected, but is transmitted to the other side of the mirror 30; this beam is labeled the "transmitted beam". The reflected beam is again collimated as it is returned to the lens 20. The lens 20 focuses the reflected beam to an end face of the fiber 12 of the dual termination wave guide 10. Thus, for a perfectly aligned system, a perfect 100% reflectivity mirror component, and a perfect lens, it is possible to attain perfect optical coupling between the top 11 and bottom 12 fibers of the dual termination wave guide 10.

The mirror 30 may, in practice, include a beam-splitting coating and/or a 13) wavelength dependent coating applied to one or the other face of a transparent substrate. Good practice dictates that the other face (if light is intended to pass through it) be Anti Reflection (AR) coated and that the transparent substrate be slightly wedged to further reduce the possibility of Fabry-Perot interference effects.

The lens 20 shown in FIG. 1 is shown only in a schematic representation. It may be asymmetric, such as plano-convex, it may be aspherical, or it may use gradient index techniques such as a GRIN (GRadient INdex) lens. The lens 20 may even include more than one element. Obviously, the main requirement is that it does an excellent job inter-converting the divergent beams associated with the free space propagation of light at the ends of the optical fibers 11, 12 with the collimated beams.

FIG. 2 shows an alternate fiber optic apparatus 5' in which a mirror 30' is used for combining an "expanded beam" with a "beam to be combined". Alternatively, in FIG. 1, the mirror component 30 was used to split the "incident" beam into a "reflected" beam and a collimated "transmitted" beam.

The positioning requirements are the same for the apparatus 5, 5' shown in FIGS. 1 and 2 respectively, in that the dual termination wave guides 10, 10' are on the opposite side of the lens 20, 20' from the mirror 30, 30'. The relative positioning is quite demanding because beams must be coupled between the ends of the two fibers 11, 12. "Passive positioning" occurs where the three optical components (i.e. dual termination wave guide, lens, and mirror) are all placed in their positions by mechanical registration. The optical components are then automatically held in the proper relationship. "Active positioning" is the alignment of parts while they are being monitored optically for performance. When the requisite performance is found, the parts are fixed relative to one another. This fixing is usually done by laser welding, soldering, or epoxy. Usually one uses "active positioning" instead of "passive positioning" because the optical positioning requirements are too exacting for the variations in the mechanical piece parts.

FIG. 3 shows an "active" alignment of the optical apparatus 5 of FIG. 1. The active alignment may be accomplished by tilting the mirror 30 to compensate for small Hoffsets (i.e. "lateral offset" in FIG. 3) of the dual termination waveguide 10. In FIG. 3, the fibers 11, 12 have been moved upwards by a specified "lateral offset" amount. If the mirror 30 were to remain in the position shown in FIG. 1, the degree of optical coupling between the first 11 and second 12 fibers would be decreased due to the misalignment. In order to realign the apparatus 5, the mirror 30 is tilted, because the fibers 11, 12 are now fixed in position. The degree of optical coupling between the first 11 and second 12 fibers may be measured as the mirror 30 is tilted to attain the optimal tilt angle with respect to the "lateral offset" of the fibers. In the production of an apparatus such as 5 or 5', one could initiate "passive" positioning of the dual termination wave guide 10 relative to the lens 20, followed by "active" tilt alignment of the mirror 30. Yet another variation in production techniques might be to use "active" alignment of the dual termination waveguide 10 and mirror tilt simultaneously.

However, the following problem persists: after fixing the positions of the parts by laser welding, solder, or curing epoxy, because of thermal expansion and/or contraction, uneven shrinkage of adhesive or otherwise, good alignment of the waveguide, lens and mirror may not be achieved or maintained.

Thus, there is currently a need for an improved method and apparatus for compensating for variations in the position of a waveguide due to slight movements of the waveguide.

SUMMARY OF THE INVENTION

The present invention involves an apparatus including an optical wave guide including at least one optical fiber, a retaining structure, said retaining structure having at least one lens disposed therein, and a mirror. The optical wave guide is coupled to a first end of the retaining structure and the mirror is coupled to a second end of the retaining structure.

The present invention also involves a method for altering the orientation of the mirror of the fiber optic assembly, including the steps of: illuminating a portion of a mirror retainer structure which holds the mirror until said portion partially melts, and removing illumination from the portion of the mirror retainer structure.

The above and other advantages and features of the present invention will be better understood from the following detailed description of the preferred embodiments of the invention which is provided in connection with the accompanying drawings.

BRIEF DESCRIPTION OF THE DRAWINGS

FIG. 1 is schematic diagram showing a first conventional fiber optic system.

FIG. 2 is schematic diagram showing a second conventional fiber optic system.

DETAILED DESCRIPTION

Figure 3:
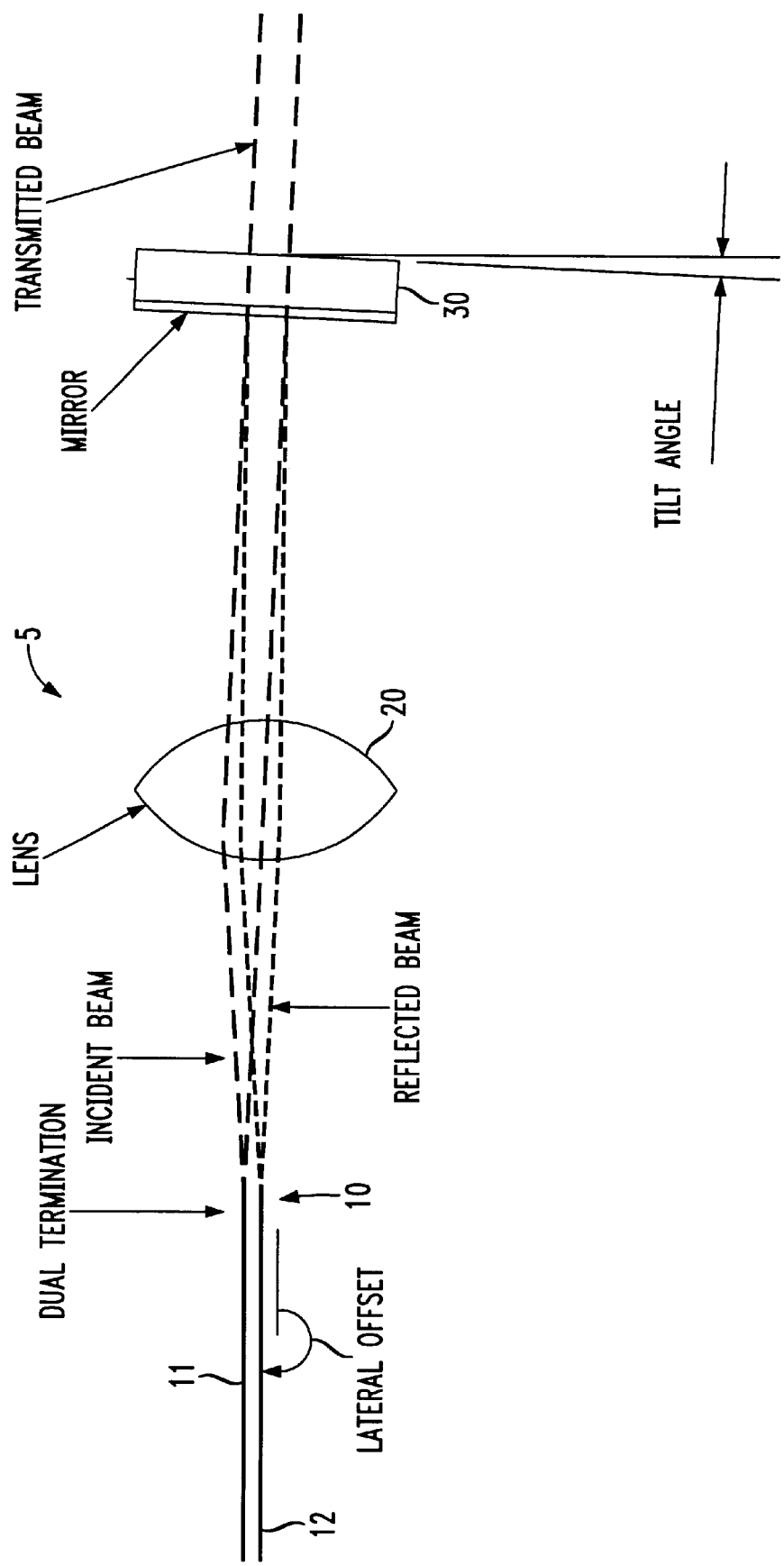
FIG. 3 shows the conventional fiber optic system of FIG. 1 with the mirror slightly tilted.
Figure 4:
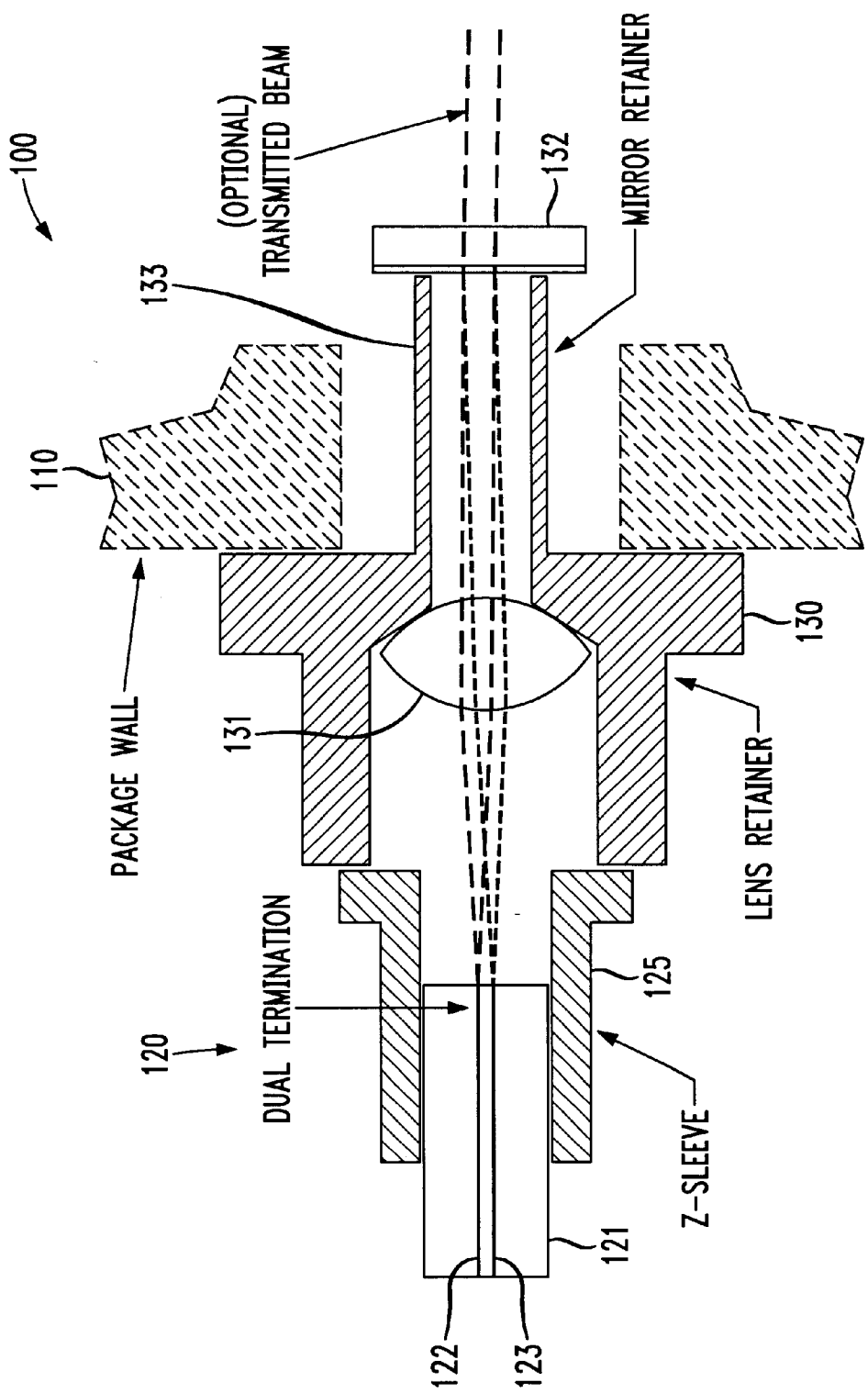
FIG. 4 is cross-sectional view showing a fiber optic apparatus according to a first exemplary embodiment of the present invention.

Referring to FIG. 4, there is shown a fiber optic apparatus 100 according to a first exemplary embodiment of the present invention. The apparatus 100 includes a package with a package wall 110, a dual termination wave guide 120, and a lens retainer 130. The dual termination wave guide 120 includes a ferrule 121 which retains optical fibers 122, 123. The ferrule 121 may be surrounded by a Z-sleeve 125. The ferrule 121, Z-sleeve 125, and lens retainer 130 may be substantially circular in cross section, or may be of any other shape known to those skilled in the art. The lens retainer 130 includes a lens 131 disposed therein, and a mirror component 132 coupled to one end thereof. The by lens retainer 130 also includes a mirror retainer portion 133 for retaining the mirror component 132. The wave guide 120 may be secured to the lens retainer 130 by coupling the Z-sleeve 125 of the waveguide to the end of the lens retainer opposite the mirror component 132 by soldering or other means known in the art. The combined waveguide/lens retainer unit 130/133 is then secured to the package wall 110 by similar methods.

Preferably, the waveguide/lens retainer unit 130/133 is subjected to laser welding (as described below) before it is secured to the package wall 110. However, the waveguide/lens retainer unit 130/133 may also be laser welded after it is attached to the package wall 110. The laser welding alters the structure of the mirror retainer portion 133 of the lens retainer 130. The alteration of the mirror retainer portion 133 serves to change the orientation (tilt) of the mirror component 132, and thus serves to provide excellent optical coupling between optical fiber 122 and optical fiber 123.

The process for producing the apparatus 100 shown in FIG. 4 may be started by first placing and fixing the lens 131 and the mirror component 132 to the lens retainer 130. At this point, the wave guide 120 remains unattached from the lens retainer 130. Light is then introduced into one (e.g. 122) of the fibers 122, 123 of the dual termination wave guide 120 and an optical power meter may be used to monitor the relative amount of light received by the other (e.g. 123) of the fibers of the dual termination wave guide. Using this method, x, y, and z coordinates for the wave guide 120 are determined. The "z-coordinate" for the dual termination wave guide 120 may be equal to the right-left separation of the dual termination wave guide 120 and the lens 131, and the "x,y-coordinates" for the dual termination wave guide may be equal to the lateral offset (up and down the page and in and out of the page, respectively) of the dual termination wave guide. The x, y, and z coordinates must be adjusted in order to maximize the observed optical coupling between the two fibers 122, 123 of the dual termination wave guide 120. For typical fiber optical applications, the positioning tolerances are no more than a few microns for the z coordinate and a fraction of a micron for the x and y coordinates.

This "active" alignment may be completed by bonding the Z-sleeve 125 to the dual termination wave guide 120 (actually the ferrule 121 surrounding the two fibers 122, 123), and then bonding the Z-sleeve to an end face of the lens retainer 130 (i.e. the end face opposite the mirror component 132).

During the bonding together of the different parts (e.g. wave guide 120 to lens retainer 130) of the apparatus 100 some components may shift, causing misalignments in the trajectories of the beams irradiated from the fibers 122, 123. One can make fine adjustments to the tilt of the mirror component 132 to re-establish alignment. This adjustment could be achieved by thermal means (e.g. laser beam) applied to the mirror retainer section 133 of the lens retainer 130 as explained in detail with reference to FIGS. 6A–6E.

Figure 5:
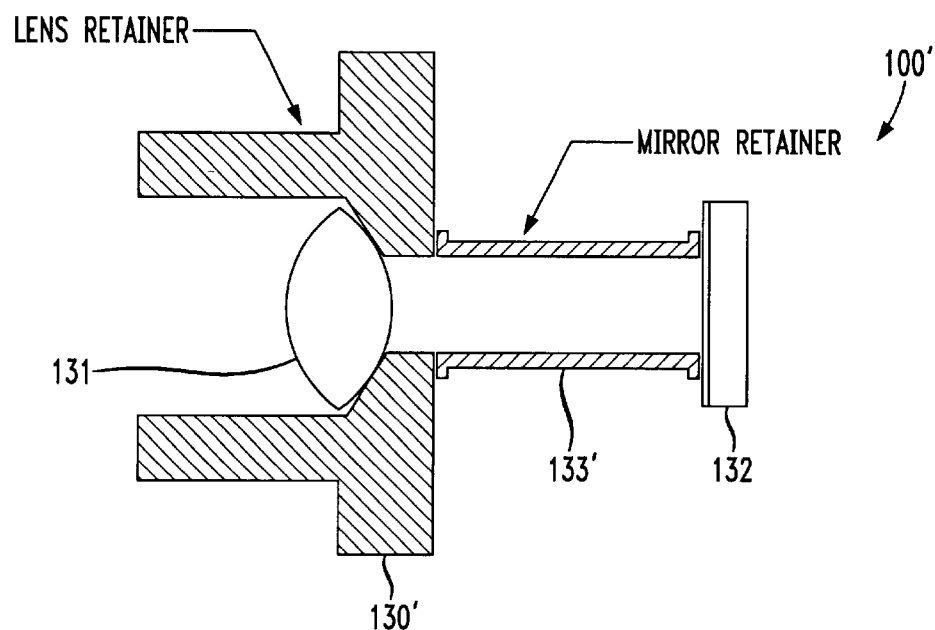
FIG. 5 is a cross-sectional view showing a portion of a fiber optic apparatus according to a second exemplary embodiment of the present invention.

The mirror retainer section 133 may be a part of the lens retainer 130 as shown in FIG. 4, or it may be a separate part 133' which is attached to another part, such as the lens retainer 130' as shown in FIG. 5. In either case, it is preferred that the mirror retainer section 133, 133' be thin walled and cylindrical with a length considerably longer than its diameter, but other shapes are possible. Similarly, it is preferred to use metal for the mirror retainer section 133, 133', but other materials such as glass and plastic are possible.

The mirror retainer 133 may be located in a protected region of the package as shown in FIG. 4. The optical apparatus 100 may be "active" with a laser diode disposed inside the package wall 110 or "passive" with additional bulk-optic filters, mirrors, lenses, detectors, etc. In any case, the wall 110 of the package may surround the mirror retainer 133 and attach more directly to the lens retainer 130 or even to the Z-sleeve 125 or dual termination wave guide 120.

Figures 6A, 6B:
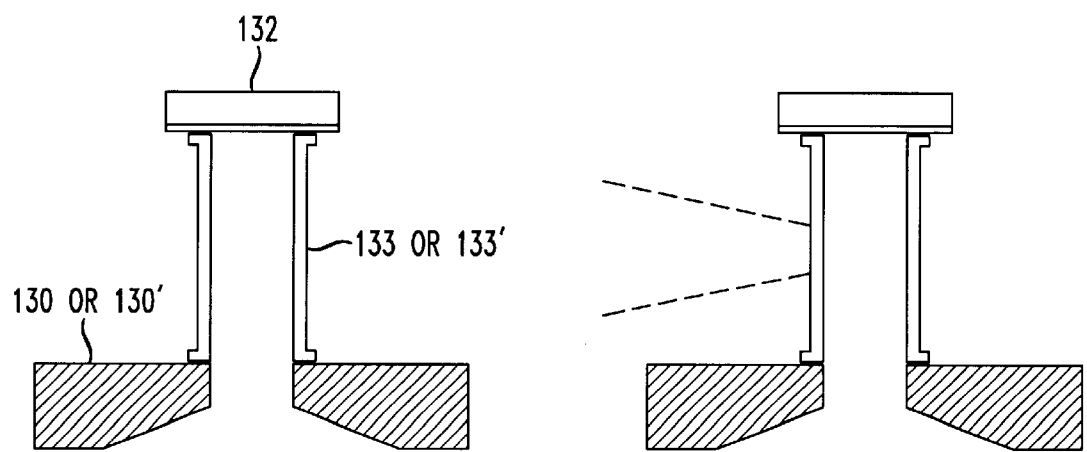
FIGS. 6(A)–6(E) show method steps for tilting the mirror of a fiber optic apparatus shown in FIGS. 4 and 5.

FIGS. 6A–6E show a proposed method of making fine adjustments to the tilt of the mirror component 132 shown in FIGS. 4 and 5. FIG. 6A shows the optical apparatus 100' of FIG. 5 as an example. Of course it should be understood that the method described below may also be performed on the optical apparatus 100 of FIG. 4.

FIG. 6B shows a high power laser beam illuminating one side of the mirror retainer 133'. The laser beam may be irradiated from a suitably powerful laser source (e.g. Neodymium (Nd) YAG laser) which is not shown in FIGS. 6A–6E. Laser diodes, carbon dioxide ($CO_2$), and carbon monoxide (CO) lasers may also be used for the laser source. The side of the mirror retainer 133' which has been chosen for illumination is arbitrary for purposes of discussion, but whichever side has been chosen is used to orient this and the remaining figures (C–E). All descriptions of tilts experienced by the mirror component 132 are referenced to the assumption that the laser illumination is on the left side of the drawing. The illumination by a laser should not be in areas close to the mirror component 132 to minimize danger to the mirror component. Similarly, it is preferred that the illumination not be close to the juncture of the mirror retainer 133' and lens retainer 130' so as to not jeopardize this juncture or to produce variable behavior as a result of variability of the juncture. The instantaneous power level of the laser should be more than 10 watts, and is more typically 500 watts (5 Joules in ¹⁄₁₀₀th of a second). The exact details of the laser power depend upon the size of the area being illuminated, the reflectivity of the surface of the mirror retainer, the material of this retainer, and the wall thickness. For example, by making the walls of the mirror retainer 133, 133' thinner, the power requirements of the laser can be decreased.

Figure 6C:
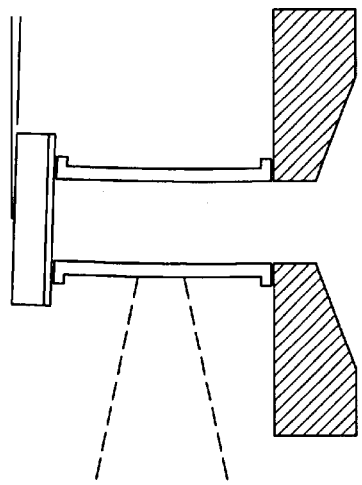

FIG. 6C shows the mirror retainer 133' after a few milliseconds of illumination by the laser. It should be noted that, at this time, the area being illuminated is being heated and is expanding. The time scale of illumination is so short that the surrounding area is not receiving much heat transfer, so there is an imbalance in the amount of expansion between the right and left sides of the mirror retainer 133'. Because the left side of the mirror retainer 133' is warmed and expanding and the right side is not, there is slight distortion which causes the mirror component 132 to tilt slightly toward the right (i.e. clockwise). For a moderate temperature rise, this distortion may be considered "elastic". Namely, if at this point the laser illumination were removed, temperature equalization would occur in a second or so by radiative cooling, convective and conductive cooling, and some heat transfer would occur around the mirror retainer 133' so that the differential expansion would subside. If the "elastic" limit of the material is not exceeded, the mirror retainer 133' would "spring back" to its original shape.

Figure 6D:
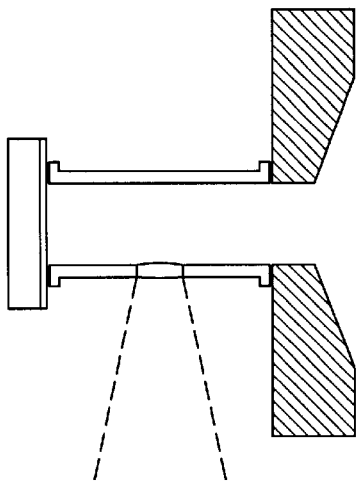

FIG. 6D shows the mirror retainer 133' after additional illumination by the high power laser. Heating has continued on the left side of the mirror retainer 133' and the melting or softening point has been reached. Although the material of the mirror retainer 133' has been heated further and has expanded in volume, the mirror component 132 is less tilted to the right than it had been in FIG. 6C. Instead, the expanding region of the mirror retainer 133' bulges outward from the original wall boundaries instead of tying to spread the area of that portion of the wall along the wall direction. The softened or melted material does not try to maintain its original shape beyond the needs of surface tension. If surface tension is not sufficient, that portion of the wall disintegrates.

Figure 6E:
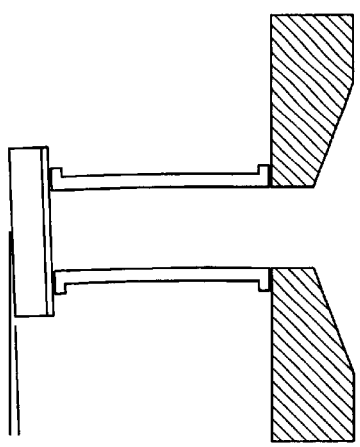

FIG. 6E shows the final and permanent distortion of the mirror retainer 133' after the illumination has been removed and the mirror retainer has cooled back down to the ambient temperature. The mirror component 132 is now tilted slightly to the left (i.e. counter-clockwise) compared to its original orientation. The distortion shown in FIG. 6E has clearly gone beyond "elastic". Notice that the permanent distortion direction is typically reversed from the "elastic" distortion case. In reality, the resolidified portion of the wall may no longer appear flat but show bulges and depressions.

Thus, through use of the above-described method, misalignments of the optical apparatus 100, 100' can be corrected by changing the orientation of the mirror component 132. The misalignments typically occur when the optical wave guide 120 is affixed to the lens retainer, therefore, prior to affixing the combined wave guide/lens retainer 120/130, 130' to the package wall 110, the method shown in FIGS. 6A–6E may be performed. These misalignments are typically due to "post-weld shift" of the wave guide 120 with respect to the lens retainer 130, 130'. The lack of proper alignment due to post weld shift or other related phenomena is manifest in that the optical coupling observed between the two fibers 122, 123 (FIG. 4) is less than expected. Unfortunately, this information does not indicate which direction one needs to redirect the tilt of the mirror component 132. By providing "elastic" distortions as portrayed in FIG. 6C, one can ascertain the proper direction to adjust the mirror component orientation. For example, one can try some laser heating (in turn) on the north, east, south, and west sides of the mirror retainer 133, 133' walls. Some of the trials may result in more optical coupling between the fibers 122, 123 and some in less coupling. The relative success then suggests which direction the mirror component 132 needs to be adjusted (e.g. north, northeast, east, etc.). Armed with this knowledge, one can provide a stronger (or longer) laser pulse that actually produces a permanent distortion such as described and shown in reference to FIG. 6E.

The above process of FIGS. 6A–6E can be iterated if the first optimization is insufficient. For example, if only half of the expected improvement has been achieved after the first optimization, one can again use "elastic" distortions to probe the proper direction for further improvement. If one wants to provide additional permanent distortion in the same direction as the previous permanent distortion, it is recommended that the wall of the mirror retainer 133, 133' not be remelted in the same place as was previously melted. This is because the remelting of the same spot causes melting of the mirror retainer 133, 133' in the same place where a stress already exists, so the mirror retainer straightens as the region melts again and then distorts again to about the same position as it had before remelting. Instead it is recommended to melt regions near the previously melted region, on the sides and above and below. It is expected that the total distortion is approximately proportional to the area that has been melted, assuming that all the melting is in the same general region. By melting regions on opposite sides of the mirror retainer 133, 133', little net permanent tilt may result.

The "elastic" distortion used to probe the direction needed to adjust the mirror component 132 tilt need not be supplied by the laser heating method outlined above. One could alternately use mechanical stresses applied directly or indirectly (e.g. localized air or gas jet) to move the mirror retainer 133, 133' from side to side.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. An apparatus comprising:
    a retaining structure, said retaining structure having a least one lens disposed therein and including a mirror retainer portion with a diameter less then a diameter of the rest of the retaining structure;
    an optical wave guide attached to a first end of the retaining structure and including at least one optical fiber disposed therein; and, a mirror coupled to the mirror retainer portion of the retaining structure,
    wherein the retaining structure is formed from a first lens retaining portion and a second portion comprising said mirror retainer portion, said first lens retaining portion coupled to said waveguide and said second mirror retainer portion coupled to said mirror, and
    wherein the first portion is secured to the second portion.

2. The apparatus of claim 1, wherein the first portion is secured to the second portion by solder.

3. The apparatus of claim 1, wherein the at least one optical fiber comprises two optical fibers disposed substantially parallel to one another.

4. The apparatus of claim 1, wherein the optical wave guide is surrounded by a sleeve.

5. The apparatus of claim 4, wherein the sleeve is coupled to retaining structure by solder.

6. The apparatus of claim 4, wherein the sleeve is coupled to the retaining structure by laser welding.

7. The apparatus of claim 1, further comprising a housing, wherein the retaining structure is coupled to the housing.

8. The apparatus of claim 1, wherein the optical wave guide and the retaining structure are substantially cylindrical.

9. The apparatus of claim 1, wherein the lens and the mirror are disposed in line with an end of the at least one optical fiber.

10. A fiber optic transmission apparatus comprising:
   a retaining structure, said retaining structure having at least one lens disposed therein and including a mirror retainer portion with a diameter less then a diameter of the rest of the retaining structure;
   an optical wave guide attached to a first end of the retaining structure and including at least two optical fibers disposed therein, said optical fibers arranged substantially parallel to one another; and,
   a mirror coupled to the mirror retainer portion of the retaining structure, wherein a beam irradiated from one of the least two optical fibers passes through the lens, is reflected by the mirror, and is recaptured by the other of the least two optical fibers, and
   wherein the retaining structure is formed from a first lens retaining portion and a second portion comprising said mirror retainer portion, said first lens retaining portion coupled to said waveguide and said second mirror retainer portion coupled to said mirror, and
   wherein the first portion is secured to the second portion.

11. The apparatus of claim 10, wherein the lens and the mirror are disposed in line with an end of the at least one optical fiber.

12. A method for altering the orientation of a mirror of a fiber optic assembly, comprising the steps of:
   illuminating a first portion of a mirror retainer structure which holds a mirror until said first portion partially melts; and,
   removing illumination from the first portion of the mirror retainer structure.

13. The method of claim 12, comprising the further step of:
   illuminating a plurality of different locations of the mirror retainer structure before illuminating said first portion.

14. The method of claim 13, comprising the further steps of:
   measuring an optical coupling degree between two fibers of the fiber optic assembly while illuminating different locations of the mirror retainer structure; and,
   determining an optimal optical coupling degree.

15. An optical apparatus formed by the process of:
   fabricating a retaining structure, said retaining having at least one lens disposed therein;
   attaching an optical wave guide to a first end of the retaining structure, said optical wave guide having at least one optical fiber disposes therein;
   illuminating a first portion of the retaining structure until said portion partially melts to correct misalignments between the optical wave guide and the retaining structure.

16. The optical apparatus of claim 15, the process comprising the further step of:
   illuminating a plurality of different locations of the retaining structure before illuminating said first portion.

17. The optical apparatus of claim 16, the process comprising the further step of:
   measuring an optical coupling degree between two fibers of the fiber optic assembly while illuminating different locations of the retaining structure; and,
   determining an optimal optical coupling degree.

18. The optical apparatus of claim 15, the process comprising the further step of:
   attaching a housing to a second end of the retaining structure, said second end disposed in an opposing relationship to said first end.

* * * * *